E. JONES.
VEHICLE WHEEL.
APPLICATION FILED OCT. 6, 1913.
1,094,574.
Patented Apr. 28, 1914.
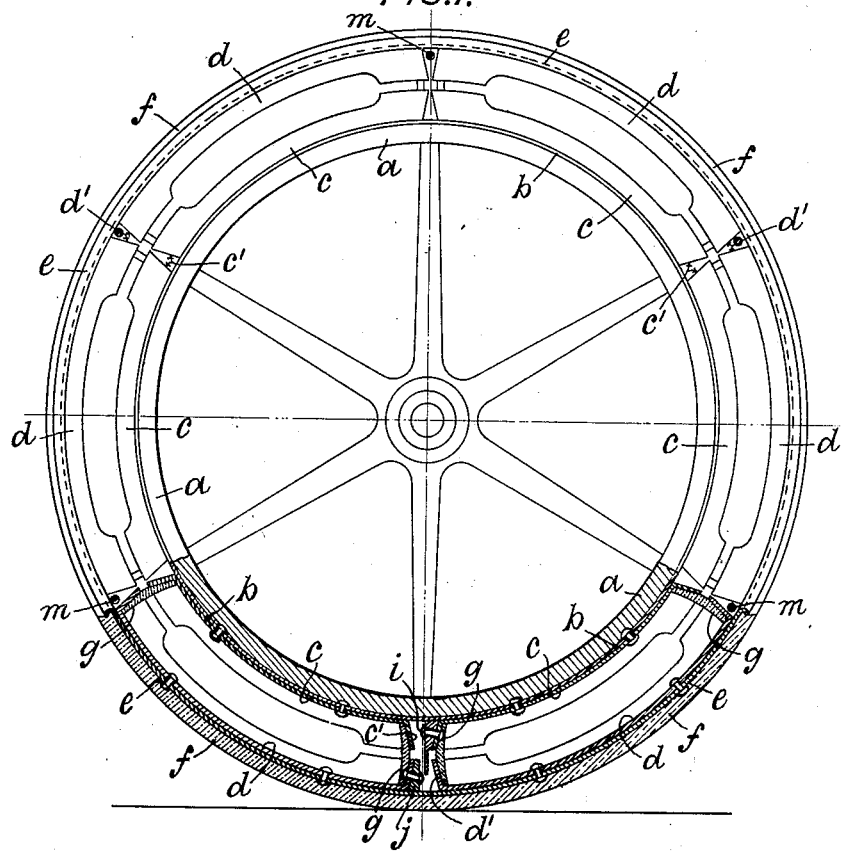
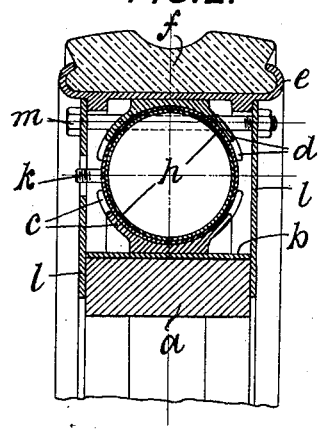
Witnesses
Chas. W. Stauffiger
Karl H. Butler
Inventor
Edwin Jones.
By
Atty's.

UNITED STATES PATENT OFFICE.

EDWIN JONES, OF GREENFIELD, NEAR HOLYWELL, WALES.

VEHICLE-WHEEL.

1,094,574.  Specification of Letters Patent.  Patented Apr. 28, 1914.

Application filed October 6, 1913. Serial No. 793,507.

*To all whom it may concern:*

Be it known that I, EDWIN JONES, a subject of the King of England, residing at "The Poplars," Greenfield, near Holywell, in the county of Flint, Wales, engineer, have invented certain Improvements in or Relating to Vehicle-Wheels, of which the following is a specification.

This invention has reference to a wheel for vehicles, more particularly motor vehicles, of that kind which is characterized by the use of cups or receptacles attached to a wheel felly and a tire-carrying rim respectively, which cups or receptacles are of greater length in the direction of the circumference of the felly and rim than breadth; and the employment of inflatable bags or tubes, each of which, when inflated lies in part within a cup of the felly and the opposite cup of the outer rim.

One object of the present invention is to provide simple and convenient means for insuring the prevention of the cutting or "nipping" of the ends of a bag or bags or tubes by the edges of its or their containing cups or receptacles when the latter approach each other, due to road shocks and vibrations, and also to assist in preventing relative circumferential displacement between the wheel felly and the outer rim. To accomplish this object there is disposed loosely within the opposite ends of each pair of said cups, pieces or disks of india-rubber or its equivalent, which span or bridge the spaces between the ends of a pair.

A further object of this invention is to provide means for positively preventing relative circumferential displacement between the wheel felly and the outer rim, either alone or in combination with said bag protecting means; and to this end there is provided on or connected with said felly and tire rim, respectively, meeting or engaging stop or buffer elements, so arranged that while preventing such circumferential displacement in the forward travel of the wheel, radial displacements are permitted.

I will describe my invention with the aid of the accompanying sheet of explanatory drawings, in which:—

Figure 1 is an elevation, partly in section, of a vehicle wheel provided with my improvements, the inflated bags or tubes being removed. Fig. 2 is a transverse section of the rim.

$a$ represents a wheel felly constructed of wood and $b$ a metal rim or hoop shrunk on to the periphery thereof, $c$ indicates metal cups or receptacles riveted to said felly rim $b$, and $d$ are metal cups or receptacles arranged to pair with those of the felly rim—riveted to the outer rim $e$, the ends $c^1$, $d^1$, of said cups $c$ $d$, respectively, extend outwardly somewhat from the bases or bottoms of the cups; $f$ is a rubber tire or tread secured in the clencher edges of said rim $e$.

$g$ (Fig. 1) represents pieces or disks of india-rubber removably fitted within the opposite ends of the cups $c$, $d$, forming a pair, which disks bridge or span the spaces between the ends of the cups pairs, and protect the ends of the bags $h$ (Fig. 2).

$i$, $j$, are metal buffer or stop pieces riveted to the ends of cups $c$, $d$, respectively, and which in practice are in sliding contact with each other for preventing circumferential displacement of the felly $a$ relatively to rim $e$. Any other suitable arrangement of stop or buffer elements for effecting this purpose may, however, be employed.

$k$ (Fig. 2) indicates a valve of bag $h$, and $l$ are side protecting plates secured in position by means of transverse bolts $m$ passed therethrough.

Having now described my invention, what I claim as new and desire to secure by Letters Patent is:—

1. In a vehicle wheel, a felly rim, a tire rim arranged circumferentially of said felly rim, oblong receptacles carried by said felly rim, oblong receptacles carried by said tire rim and confronting the receptacles of said felly rim and coöperating therewith in supporting inflatable bags, cushions arranged at the inner sides of the end walls of said receptacles, and buffers arranged at the outer sides of the end walls of said receptacles and adapted to prevent circumferential displacement of the tire rim relatively to the felly rim.

2. In a vehicle wheel, a felly rim, a tire rim arranged circumferentially of said felly rim, a plurality of spaced oblong receptacles secured to said felly rim, a plurality of spaced oblong receptacles secured to said tire rim and confronting the receptacles of said felly rim, bags arranged in said receptacles, cushions arranged between the ends of said bags and the end walls of said receptacles, contacting buffers arranged between the end walls of said receptacles, and side plates held by said tire rim and adapted to inclose said receptacles.

3. In a vehicle wheel, a felly rim, a tire rim arranged circumferentially of said felly rim, a plurality of oblong receptacles secured to said felly rim, a plurality of oblong receptacles secured to said tire rim and confronting the receptacles of said felly rim, inflatable bags housed by said receptacles, cushions arranged in said receptacles between the end walls thereof and the ends of said bags, buffers arranged between the ends of said receptacles and adapted to prevent circumferential displacement of said tire rim relatively to said felly rim, side plates engaging said tire rim and inclosing said receptacles, and means extending between the ends of said receptacles and connecting said side plates.

In testimony whereof I affix my signature in the presence of two witnesses.

EDWIN JONES.

Witnesses:
JOHN H. WALKER,
ISOBEL WALKER.

---

Copies of this patent may be obtained for five cents each, by addressing the "Commissioner of Patents, Washington, D. C."